United States Patent
Basel

(10) Patent No.: US 6,473,801 B1
(45) Date of Patent: Oct. 29, 2002

(54) SYSTEM AND METHOD FOR ARBITRATING BANDWIDTH ON SEGMENTED NETWORK TOPOLOGIES

(75) Inventor: Peter L. Basel, Bolton, MA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/275,357

(22) Filed: Mar. 23, 1999

(Under 37 CFR 1.47)

(51) Int. Cl.[7] ............................................. G06F 15/173
(52) U.S. Cl. ........................................ 709/226; 709/235
(58) Field of Search ............................... 709/229–232, 709/226, 235, 236

(56) References Cited

U.S. PATENT DOCUMENTS 5,012,469 A * 4/1991 Sardana
5,124,981 A * 6/1992 Golding
5,719,868 A * 2/1998 Young

* cited by examiner

Primary Examiner—John A. Follansbee
(74) Attorney, Agent, or Firm—Sawyer Law Group LLP

(57) ABSTRACT

A system and method for arbitrating bandwidth between nodes on a network. A count, referred to as the idle gap count, stores the number of nodes that require bandwidth on the network. The count is passed between the nodes and bandwidth is allocated accordingly to effectuate optimization and fair allocation of bandwidth on the network.

14 Claims, 5 Drawing Sheets

SYSTEM AND METHOD FOR ARBITRATING BANDWIDTH ON SEGMENTED NETWORK TOPOLOGIES

FIELD OF THE INVENTION

This invention relates to network resource allocation. More specifically, the invention relates to bandwidth allocation on computer networks.

BACKGROUND OF THE INVENTION

A segmented network is a network that is broken up into groups in order to contain broadcast traffic and improve performance. Segmented network seamlessly provide access to resources located on different nodes in the groups using a shared communications line. A segmented bus network is a topology for a segmented network in which each nodes are connected to a network communications bus. The nodes typically comprise computers coupled to the communications bus enabling data transfer between the computers. On a standard bus network, each node monitors activity on the line. Messages are detected by all nodes but are accepted (or stripped) by the node(s) to which they are addressed. To avoid collisions that occur when two or more nodes try to use the line at the same time, bus networks commonly rely on collision detection or token passing to regulate traffic.

A bus network that uses token passing to regulate traffic is referred to as a token bus network on which a token governing the right to transmit data is passed from one station to another, and each station holds the token for a brief time, during which it alone can transmit information. A topology such as token bus network has the advantage of enforcing fairness on the medium as each segment is given an equal opportunity to transmit data over the bus. However, arbitrating bandwidth in this fashion virtually eliminates the flexibility associated with a segmented network as only one segment can communicating at a given time. A token passing solution also has the undesirable characteristic of failing to make use of the bandwidth advantage of segmented media.

The conventional Ethernet provides an alternative bandwidth arbitration method on a bus network that relies upon a form of access known as carrier sense multiple access with collision detection (CSMA/CD) to regulate traffic. With CSMA/CD, each node on the network monitors the line and transmits when it senses that the line is not busy. If a collision occurs because another node is using the same opportunity to transmit, both nodes stop transmitting. To avoid another collision, both nodes wait for differing amounts of time before attempting to transmit again. This protocol has the advantage of being localized and adaptive to congestion but the protocol responds slowly to changes in traffic and may over correct because of the exponential increase in wait times as congestion increases.

What is needed, then, is a localized arbitration system that offers equal opportunities for data transmission to each node on a segmented network without wasting the available bandwidth. Ideally, the arbitration scheme would also require limited network communication between the nodes to maximize bandwidth availability.

SUMMARY OF THE INVENTION

The present invention is a system and method for arbitrating bandwidth on segmented network topologies. The method has nodes on the network maintain a count, referred to as the idle gap count, that indicates the number of nodes downstream in the inserting state. After a node inserts a packet into the data stream, the idle gap count is used to determine how many idles must be passed before the next packet can be inserted by the node. This process is repeated for each inserting node in the network.

DETAILED DESCRIPTION OF THE INVENTION

Segmented networks comprise nodes that are coupled to a communications channel enabling the sharing of resources between the nodes. The present invention can be used in conjunction with any node that is coupled to a processor, and with a memory device that can store an integer value. Examples of such nodes include supercomputers, mainframes, superminicomputers, minicomputers, workstations, microcomputers and other network devices. The present specification describes the invention as being used in conjunction with a desktop computer for purposes of illustration only.

Figure 1:
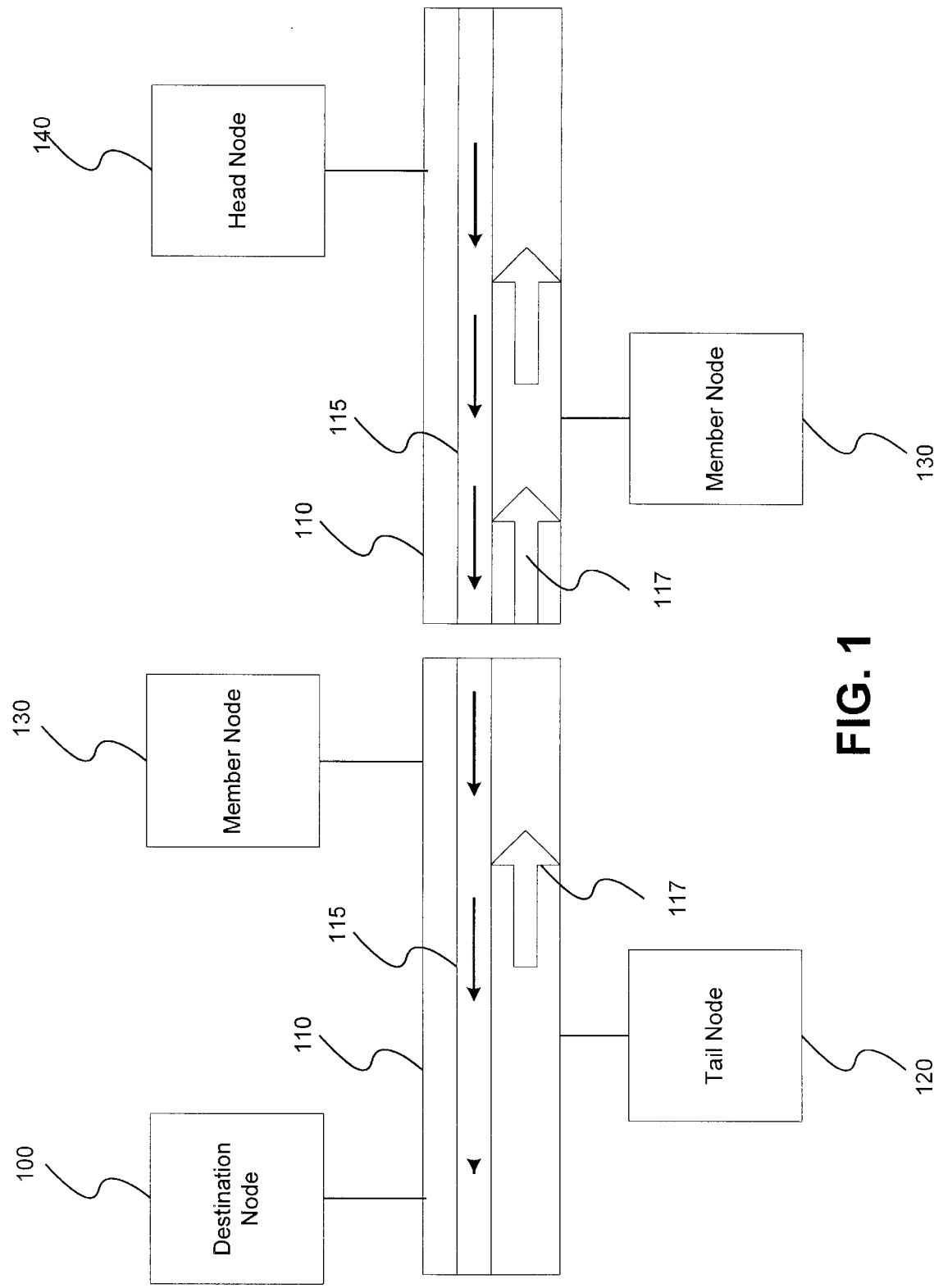
FIG. 1 is a block diagram of a segmented network illustrating one embodiment of the present invention.

Referring now to FIG. 1, a segmented network illustrating one embodiment of the present invention is shown. The segmented network includes a destination node 100, a tail node 120, two member nodes 130, and a head node 140, all coupled to a communications bus 110. The communications bus 110 provides a data stream 115 for transmitting data between the nodes on the network. The destination node 100 is the last node on the network that is receiving, but not transmitting, information. In a preferred embodiment, the destination node 100 is the final destination for all data being transmitted over the communications bus 110. Alternatively, nodes other than the destination node 100 can receive data transmissions from other nodes on the network. For example, the head node 140 could transmit some data to the destination node 100 and some data to the tail node 120.

The tail node 120 is the last inserting node before the destination node 100 on the bus 110. An inserting node is a node on the network that is currently inserting, or is attempting to insert, data packets into the data stream 115 transmitted over the communications bus 110. The tail node 120 may physically be the last node before the destination node 100, or there may be non-inserting nodes between the tail node 120 and the destination node 100. Furthermore, as soon as a node that is currently the tail node 120 stops inserting data, the next inserting node upstream of current tail node 120 becomes the new tail node 120.

The head node 140 is the first inserting node on the communications bus 110, and is the node that begins the stream of data that is transmitted over the bus 110. As was true with the tail node 120, status as the head node 140 will change depending upon the location of the first inserting node. For example, when a node upstream of the original head node 140 begins transmitting data over the bus 110, the transmitting node becomes the new head node 140 on the network.

The network also includes member nodes 130, which are all of the nodes that are coupled to the communications bus between the head node 140 and tail node 120. Member nodes 130 may or may not be transmitting data over the communications bus 110. Additionally, member nodes 130 may receive data from the head node 140 or other nodes upstream of the member node 130.

The present invention provides a system and method for arbitrating bandwidth between the head node 140, the tail node 120 and any member nodes 130 transmitting data over the bus 110. In general, when a node has data to transmit over the communications bus 110, the node passes the data to the bus using a bypass FIFO. The bypass FIFO has room for the packet as long as the network bus is not overly congested. As congestion increases, however, it is likely that the bypass FIFO will not have room for the next packet and the node will be blocked from inserting any further packets. At this point, the network bandwidth must be arbitrated or the blocked node, and any nodes downstream of the blocked node, will continue to be blocked.

As soon as a node is blocked from inserting, the tail node 120 of the present invention passes a value, referred to as the idle gap count 117, to the next node upstream of the tail node 120 using an output port. The output port may be a direct communications channel between the nodes, such as a direct connect cable or similar means for direct communication, or may be transmitted over the network bus 110. The idle gap count 117 provides a count of the number of nodes, downstream of the current node, that are attempting to insert data into the data stream 115. Since the tail node 120, by definition, is the last inserting node before the destination node 100, the idle gap count 117 of the tail node 120 is zero. As the tail node 120 is in the inserting state, however, the tail node 120 passes an idle gap count 117 of one indicating to the next node upstream that one node downstream is inserting data.

The idle gap count 117 is stored as soon as it is received by the node upstream of the tail node 120. If the node that received the idle gap count 117 is also attempting to insert data into the data stream 115, then the idle gap count 117 is incremented by one and passed to the next node. This lets the next node upstream know that there are two nodes that are presently attempting to insert data. If the node that received the idle gap count 117 from the tail node 120 is not attempting to transmit data, then an idle gap count 117 of one is passed on to the next node directly upstream. This process is repeated for each node on the network until the head node 140 is reached.

The idle gap count 117 received by the head node 140 represents the total number of nodes that are currently attempting to transmit data over the bus 110. The head node 140 uses the idle gap count 117 to create a data stream 115 with a combination of data packets and free space, or idle values, such that the bandwidth can be equally shared by each of the nodes downstream. More specifically, after the head node 140 has inserted a data packet into the data stream 115, the head node 140 transmits a number of idles equal to the length of the data packet inserted multiplied by the stored idle gap count 117. Assume, for example, that there are two nodes downstream of the head node 140 that are attempting to transmit data over the bus 110. If the head node 140 transmits a data packet with a length of four, then the head node 140 will pass eight idles before transmitting another data packet. The size of the packets being inserted can be of any length as the number of idles will be adjusted accordingly. This data transmission process is repeated for each node that is transmitting data on the network.

The process continues until a node experiences a change in state that occurs when a node goes from the inserting state to the non-inserting state or vice-versa. When a node that was previously transmitting data is no longer transmitting, then additional bandwidth is available and the idle gap counts 117 of nodes upstream must be decreased to reflect that change. In this case, the node retrieves the stored idle gap count 117 and, without incrementing it, passes it to the next node upstream. If a node that was previously not transmitting data begins transmitting, then the idle gap count 117 must be increased to reflect the change. In this case, the node retrieves the stored idle gap count 117 and increments the value by one. In either case, the updated idle gap count 117 continues upstream, with each node either incrementing it to reflect the current inserting state of the node, or passing it on unchanged to reflect the current non-inserting state of the node, until the head node 140 is reached. The bandwidth usage is once again optimized.

Figure 2:
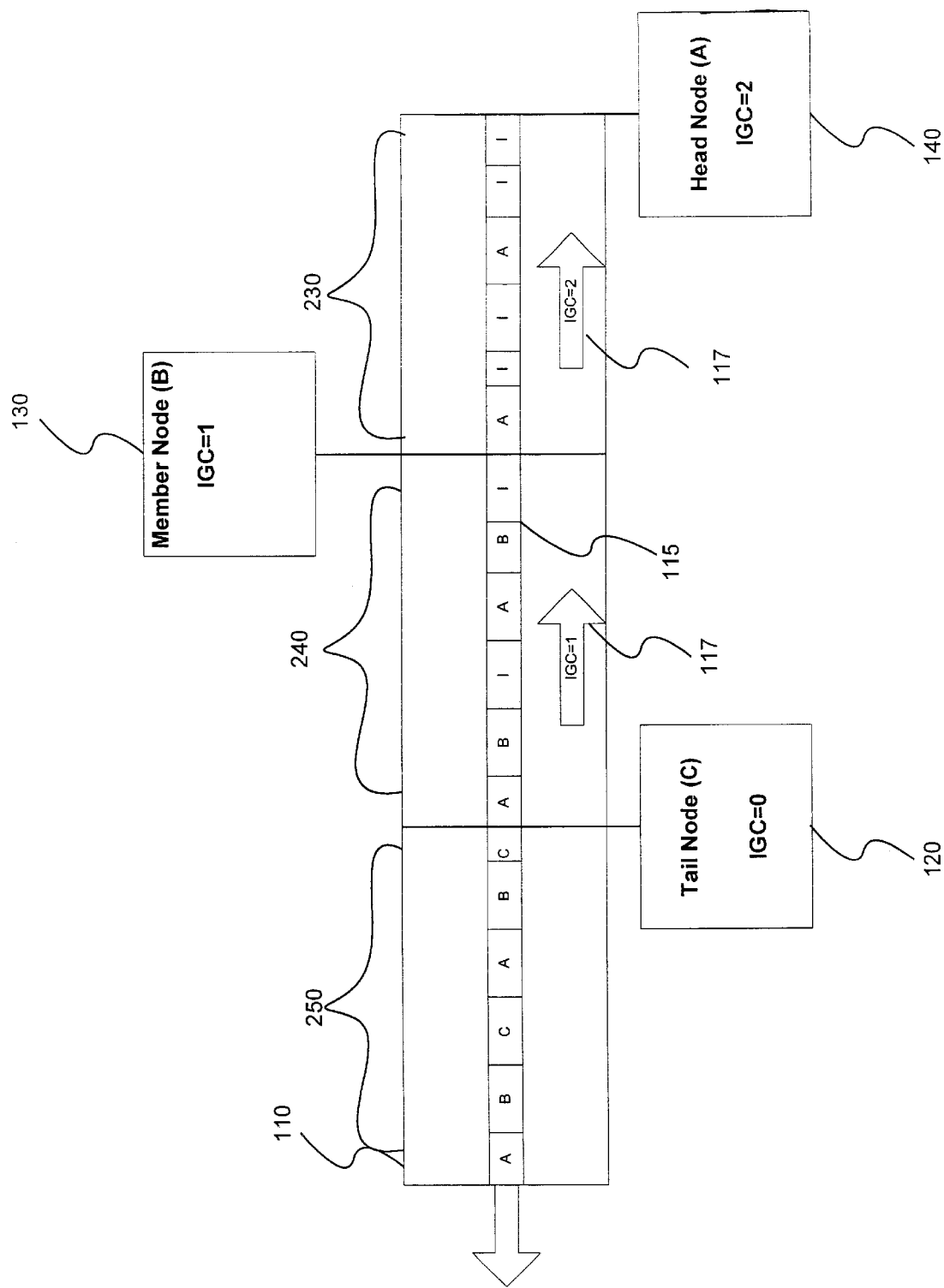
FIG. 2 is a diagram illustrating the details of data being inserted into the data stream in accordance with the present invention.

Referring now to FIG. 2, a diagram illustrating the details of data being inserted into the data stream 115 is shown. For purposes of illustration, it will be assumed that the packets in the data stream 115 have a length of one. The data stream 115 is illustrated as being transmitted over the communications bus 110 in accordance with the present invention. As explained above, the tail node 120 is the last inserting node prior to the destination node 100. The tail node 120 passes an idle gap count 117 of one to the next node upstream 130 indicating that the node 120 is currently in the inserting state. The member node 130 stores the passed idle gap count 117. As the member node 130 is also in the inserting state, the member node 130 increments the stored idle gap count 117 to two and passes it to the head node 140.

The head node 140 receives and stores the idle gap count 117, and inserts the first data packet into the stream 115. As the head node 140 has an idle gap count 117 of two, it passes idle packets equivalent to twice the length of the packet inserted into the stream 115. The two to one ratio is maintained for each of the packets inserted into the data stream 115. The resulting data stream 230 shows the appropriate combination of idles and packets. The process is repeated as the data stream 115 passes the member node 130. The member node 130 has an idle gap count 117 of one so an idle is passed for every packet inserted. The resulting stream 240 is split appropriately between the head node 140 and the member node 130. Finally, the data stream 115 reaches the tail node 120. The tail node 120 has an idle gap count 117 of zero so every idle that is available will be used. The tail node 120 inserts data into any remaining idle spaces. The resulting data stream 250 is both optimized and fair, since the data stream is completely used and each of the nodes receive an equal share of the data stream 115.

Figure 3:
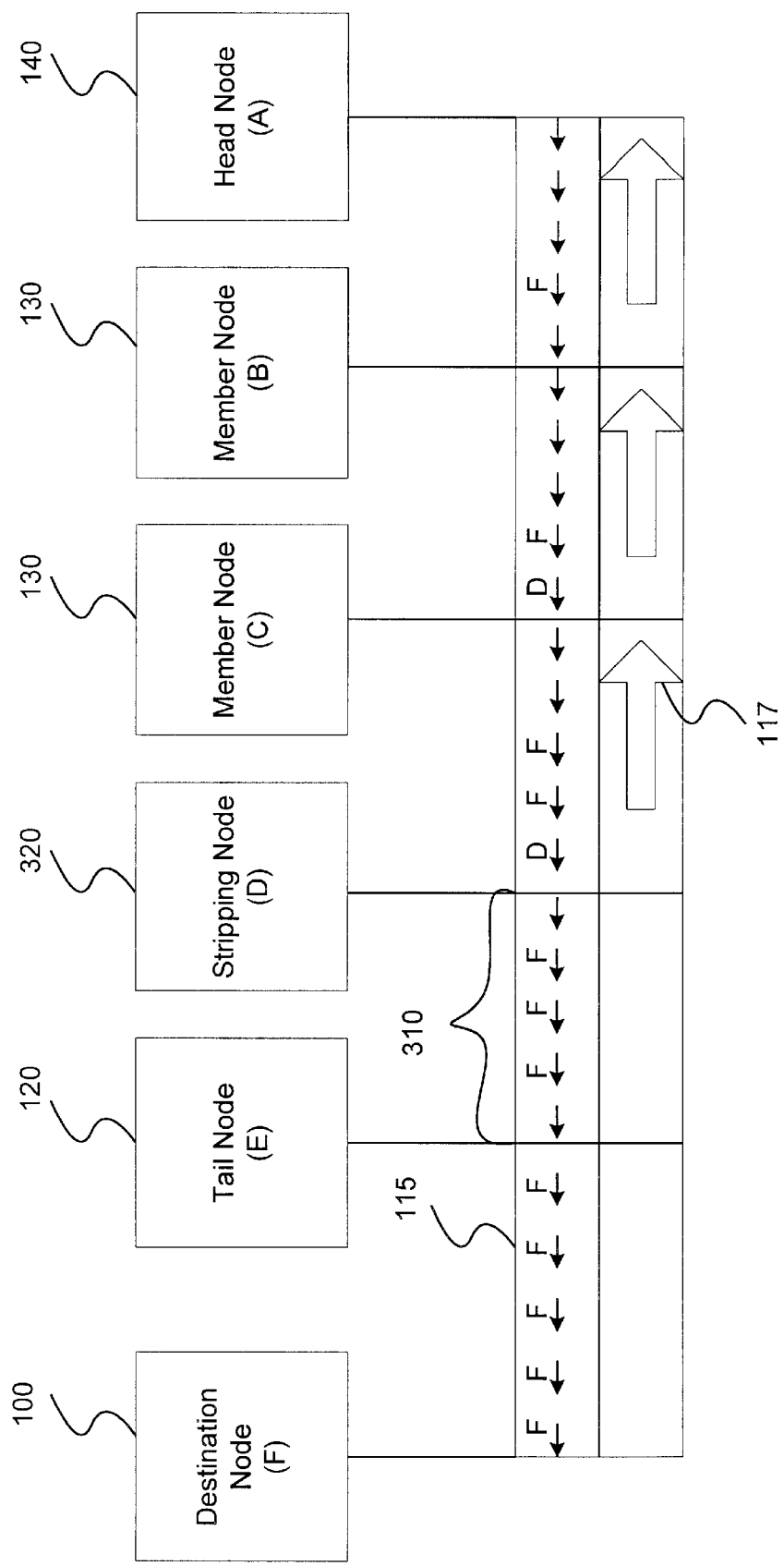
FIG. 3 illustrates an allocation method that may be used to reduce the problems associated with early stripping of data in the data stream.

As long as all of the data is being transmitted to a node downstream of the tail node 120, bandwidth usage among nodes on the network is fair and optimized. Bandwidth usage is no longer fair, however, when data is transmitted to a node upstream of the tail node 120 resulting in data stripping from the data stream 115 before the tail node 120 is reached. An allocation method that may be used to reduce the problems associated with such early stripping is illustrated in FIG. 3. One of the problems associated with early stripping is that the nodes downstream of the stripping node 320 receive a significantly higher share of the bandwidth than the nodes upstream of the stripping node 320. This inefficiency is particularly significant when the node 320 is stripping the equivalent of the network traffic from at least one node. The allocation method attempts to equalize bandwidth share when a node upstream of the tail node 120 is stripping data from the data stream 115. For simplicity, the nodes are labeled A through F and the traffic destined for each of those nodes is labeled accordingly.

The data stream 115 comprises data that is destined for the destination node 100 and a stripping node 320. Prior to stripping by the stripping node 320, one-fifth of the data stream 115 would be allocated to each of the five nodes in the inserting state. In this case, one of the member nodes 130 is transmitting data to the stripping node 320. Each of the nodes will insert data into the data stream 115 until the stripping node 320 is reached. At this point, the stripping node strips the data that has been addressed to node D. As the stripping node 320 strips the data, increased bandwidth is available to the tail node 120 that was not available to the nodes upstream of member node 130. The stripping node 320 inserts data into the stream 115 in the proper packet to idle ratio. The resulting stream 310, however, has left two-fifths, rather than one-fifth, of the data stream for the tail node 120. The unfair bandwidth allocation is further exacerbated as the number of packets stripped by the stripping node 320 increases.

In order to compensate for such data stripping, stripping node 320 tracks the number of idles that have passed for every packet that is stripped from the stream. This allows the node to calculate whether the amount being stripped amounts to the data transmission of a single node. The node is stripping at least as much data as a single node inserts if the ratio between lengths of the stripped packets and the total number of idles exceeds the idle gap count 117 incremented by one.

When the ratio exceeds the incremented idle gap count 117, the data stripping by the node 320 frees bandwidth space equivalent to an inserting node. In order to compensate for the increase in available bandwidth, the stripping node 320 passes a new idle gap count 117 to the next node 130 upstream. The new idle gap count 117 that is passed will be one less than the normal value that would be passed in order to allocate additional bandwidth to the node(s) upstream. For example, when the ratio is exceeded and the stripping node 320 is also inserting data into the stream 115, then the node 320 retrieves the stored idle gap count 117 and passes the count 117 to the next node upstream 130 without incrementing it. If, however, the stripping node 320 is not inserting data into the data stream 115, then the node 320 retrieves the stored idle gap count 117 and reduces it by one and passes it to the next node upstream 130. The new idle gap count 117 causes the nodes upstream of the stripping node 320 to increase bandwidth consumption by decreasing the number of idles that must be passed for each packet inserted, thereby resulting in greater bandwidth optimization. Once the ratio falls below the incremented idle gap count 117, the stripping node 320 passes the standard idle gap count 117 and normal bandwidth allocation resumes.

Figure 4:
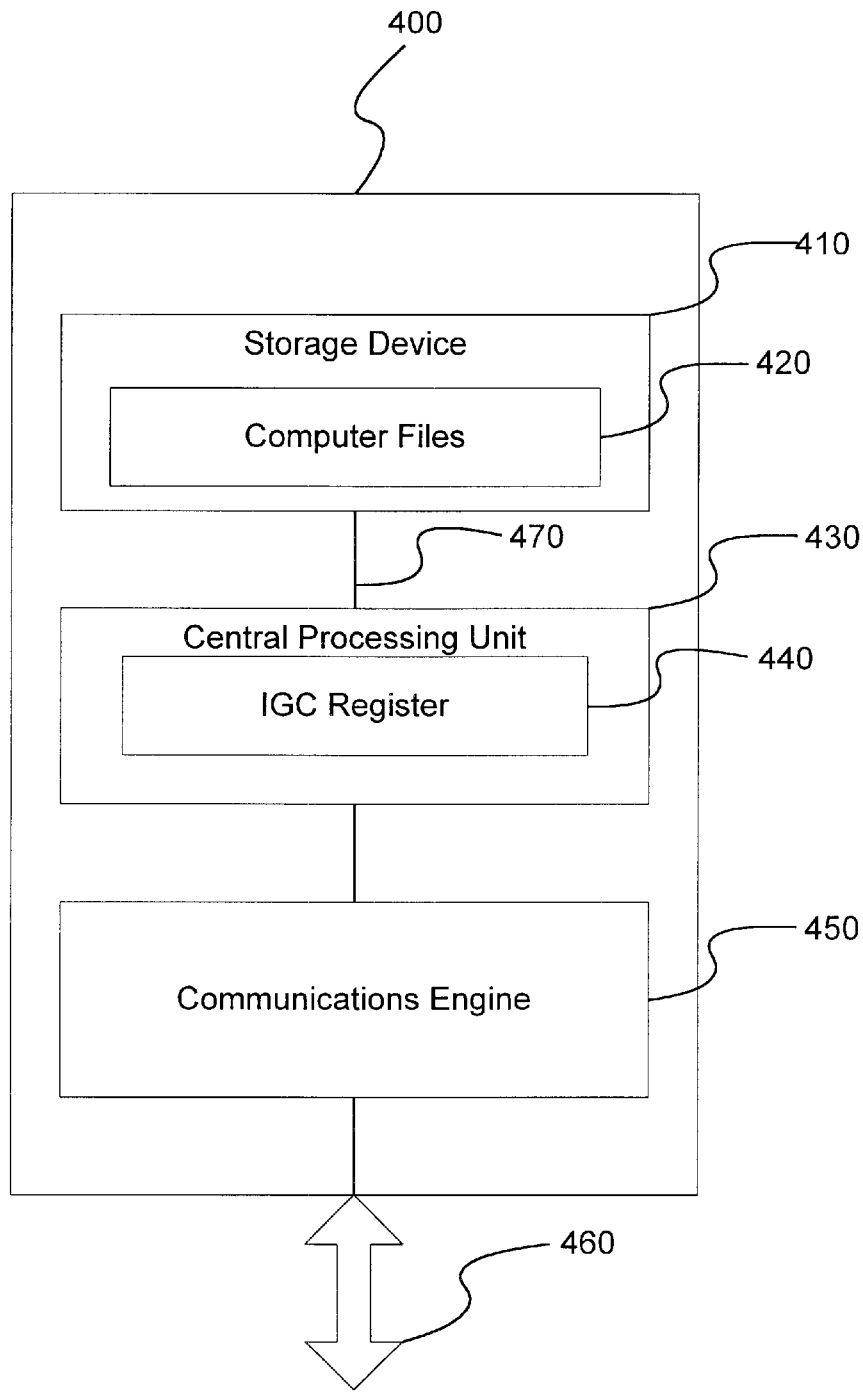
FIG. 4 is a block diagram of a sample node.

Referring now to FIG. 4, a block diagram of a sample node is shown. The sample node comprises a storage device 420, a central processing unit 430, a communications engine 450, and a communications channel 460 all coupled to the data bus 470. The central processing unit (processor) 430 is the computational and control unit of the node. In a preferred embodiment, the processor is a microprocessor, such as a Pentium® processor produced by Intel Corp., in a microcomputer. Alternatively, the processor 430 comprises any central processing unit that has the ability to fetch, decode, and execute instructions and to transfer information to and from other resources over the computer's main data-transfer path, such as a data bus The storage device 410 is an apparatus for recording data in permanent or semi-permanent form. For example, the storage device 410 may comprise random access memory (RAM), a disk drive or an external memory device. The storage device 410 may further comprise computer files 420 that store data which can be transmitted over the communications channel 460. The computer files 420 may be in any form that is retrievable by the processor 440 via the data bus 470. In a preferred embodiment, the processor 430 retrieves computer files 420 from the storage device 410 and transfers the files 420 over the data bus 470 to the communications engine 450.

The communications engine 450 is also coupled to the data bus 470 of the node and is the primary interface between the node and the communications channel 460. The communications engine 450 uses conventional communication protocols to transfer the files 420 to the communications channel 460 and ultimately to the communications bus 110. The communications engine 450 may further use the communications channel 460 to monitor the data stream 115 to insure that any data being transmitted to the node is stripped. Data being transmitted to the node includes both data being transmitted downstream and. idle gap counts 117 that are transmitted upstream.

When an idle gap count 117 is retrieved by the communications engine 450, the idle gap count 117 is sent to the processor 430 over the data bus 470. In a preferred embodiment, the processor 430 retrieves the count 117 and stores the count 117 in a register 440 located within the processor 440. The idle gap count 117 could alternatively be transmitted over the data bus 470 and stored on the storage device 410. If the node is transmitting data over the communications channel 460 when the idle gap count 117 is received, the processor 430 increments the count 117 and passes the count 117 to the communications engine 450. Otherwise, the processor 430 retrieves the stored idle gap count 117 and passes the count 117 directly to the communications engine 460 unchanged. The communications engine 450 uses the communications channel 460 to pass the idle gap count 117 to the next node upstream.

If the node experiences a change in state, such as when the node stops or starts inserting data into the data stream, a revised idle gap count 117 must be passed to the next node upstream. The processor 430 retrieves the idle gap count 117 from the register 440. The value 117 is incremented if the node is moving from the non-inserting to the inserting state; otherwise, the value is unchanged. The idle gap count 117 is then passed via the data bus 470 to the communications engine 450. The communications engine 450 uses the communications channel 460 to pass the idle gap count 117 to the next node upstream.

Figure 5:
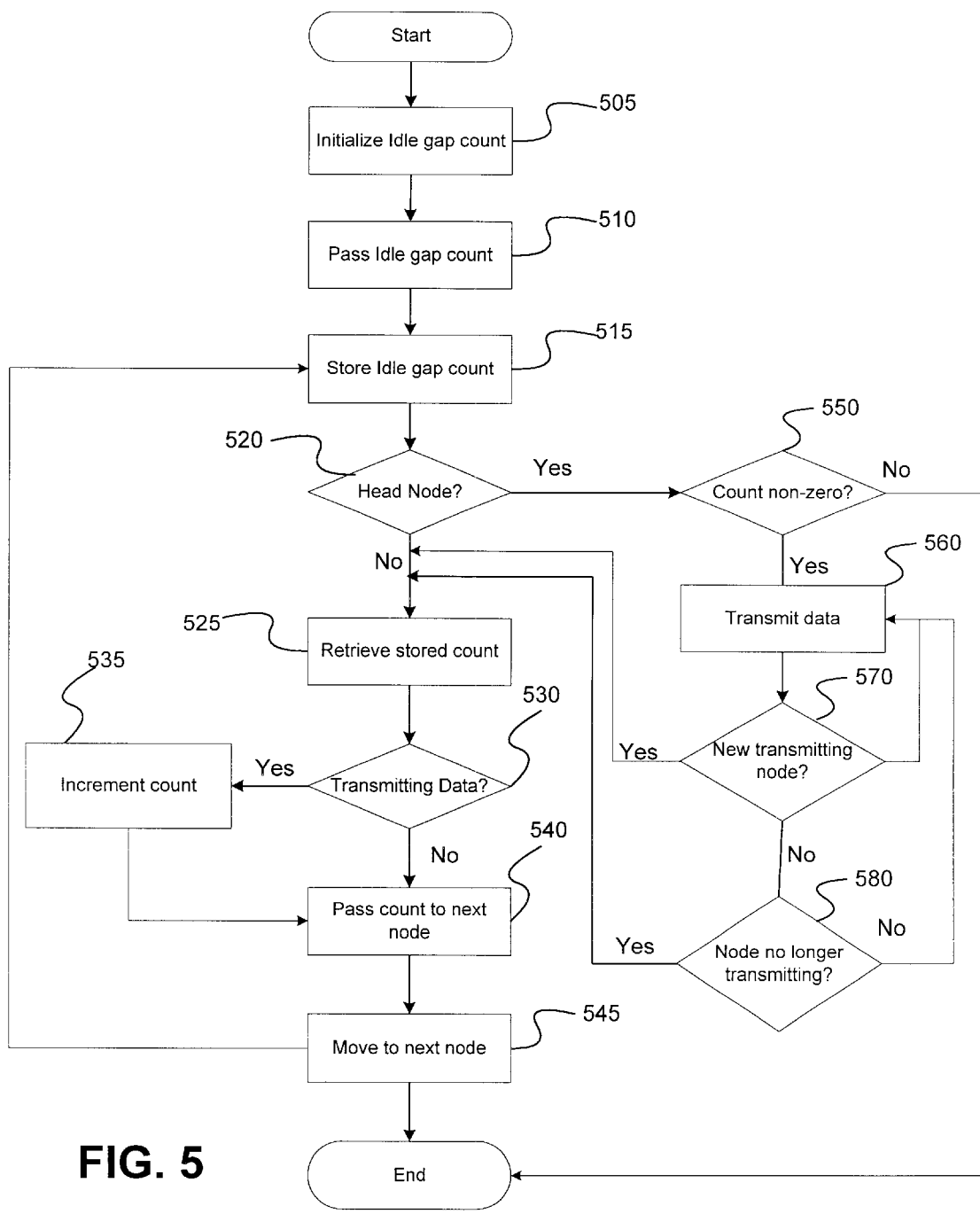
FIG. 5 is a flowchart illustrating an embodiment of the method of the present invention.

Referring now to FIG. 5, there is shown a flowchart illustrating an embodiment of the method of the present invention which begins with initializing 505 the idle gap count 117 of the tail node 120 to zero. As the tail node 120 is inserting data, the node 120 increments the count and passes 510 the count to the next node upstream. The node upstream receives the count 117 and stores 515 the idle gap count 117 on the node. The count 117 may be stored in the storage device 410 or in a register 440 in the central processing unit 430. The node assesses 520 whether it is the head node 140 (i.e., is the first inserting node on the communications bus that is not passing data transmitted by another node upstream). When the node is not the head node 140, the node retrieves 525 the stored idle gap count. If the node is presently transmitting data 530 over the communications bus 115, then the node increments 535 the idle gap count by one. The node passes 540 the value to the next node upstream.

The method then moves 545 to the next node upstream, repeating steps 515 through 545 until a determination 520 is made that that the current node is the head node 140. The head node determines 550 whether the idle gap count is non-zero. The idle gap count 117 is non-zero as long as the network is being arbitrated according to the present invention. As long as the idle gap count 117 is non-zero, each of the inserting nodes transmit 560 data in accordance with their respective idle gap count 117. For each data packet that is inserted into the data stream 115, the inserting node passes or transmits enough idle spaces in the stream 115 to allocate an equal share of the bandwidth to each of the nodes downstream of the inserting node. More specifically, the number of idles passed is equal to the idle gap count multiplied by the length of the packet inserted into the data stream 115.

Each of the non-transmitting nodes assess 570 whether it has data to transmit. When a node experiences a change in state from a non-inserting to an inserting state, each of the idle gap counts of nodes upstream of that node must be revised. In order to effectuate this revisions, 515 through 545 are repeated for each node upstream of the newly inserting node. The transmitting nodes determine 580 whether data transmission is complete. When a node completes transmitting data, the idle gap counts for each node upstream of the node that has experienced a change in state must be revised so 515 through 545 are repeated. As long as no change in state occurs, the method continues and data is transmitted 560 accordingly. As each of the nodes completes data transmission, the idle gap count 117 of the head node 140 is reduced accordingly. As soon as the head node 140 determines 550 that the idle gap count 117 is zero, the network returns to the unarbitrated state and the method ends.

I claim:

1. A method for arbitrating bandwidth in a network of nodes when data transmission exceeds the communications bandwidth of a network, said method performed for each transmitting node comprising:
    assessing the number of nodes arrayed in the network, downstream of the current node, that are transmitting data into a data stream by;
        initializing the idle gap count of a tail node to one;
        transmitting the idle gap count to the next node upstream of a head node;
        responsive to a node receiving a new idle gap count from a node downstream:
            storing the idle gap count transmitted by a node downstream; incrementing the count by one if the receiving node is presently transmitting; and
            passing the value to a next node upstream;
        responsive to a previously non-transmitting node transmitting data:
            retrieving the idle gap count of the node;
            incrementing the idle gap count by one;
            passing the incremented idle gap count to the next node upstream;
        responsive to the completion of the data transmission by a previously transmitting node, passing the idle gap count of said node to the next node upstream;
    inserting a data packet into said data stream; and
    transmitting a set of idle bytes equal to the length of the inserted data packet multiplied by the number of downstream nodes currently transmitting data.

2. The method of claim 1, wherein the data stream comprises data traveling over a communications bus on a segmented network.

3. The method of claim 2, wherein assessing the number of nodes comprises assessing the number of computers coupled to the communications bus on the network.

4. The method of claim 1, wherein the step of inserting comprises inserting data packets of fixed lengths.

5. The method of claim 1, wherein the step of inserting comprises inserting data packets of variable lengths.

6. The method of claim 1, wherein the tail node is an inserting node closest to the final destination of data in the stream.

7. The method of claim 1, wherein the idle gap counts are passed over a communications line coupling the nodes.

8. The method of claim 7, wherein the communications line is a bus on the network.

9. The method of claim 1, wherein the packets inserted into the data stream are all sent to a destination node.

10. The method of claim 9, wherein the destination node comprises a node downstream of the tail node.

11. The method of claim 1, wherein the packet inserted into the data stream comprises data being sent to a stripping node.

12. The method of claim 11, wherein the step of assessing the number of nodes inserting data further comprises the steps of:
    counting the data packets stripped by the stripping node;
    counting the idles that pass the stripping node as the packets are stripped;
    calculating a ratio between the number of packets stripped and the number of idles passed;
    responsive to the calculated ratio exceeding the idle gap count of the stripping node by more than one:
        if the stripping node is inserting data, passing an idle gap count of the stripping node to the next node upstream; and
        if the stripping node is not inserting data, passing the idle gap count of the stripping node reduced by one to the next node upstream.

13. A method for assessing the number of nodes on a network that are transmitting data, said method comprising the steps of:
    initializing the idle gap count register of a head node to one;
    transmitting the idle gap count to the next node upstream of the head node;
    responsive to a node receiving a new idle gap count from a node downstream:
        storing the idle gap count transmitted by a node downstream;
        incrementing the count by one if the receiving node is presently transmitting; and
        passing the value to a next node upstream;
    responsive to a previously non-transmitting transmitting data:
    incrementing idle gap count value of said node by one;
    passing the incremented idle gap count to the next node upstream;
    responsive to completion of the data transmission by a previously transmitting node, passing the idle gap count register value of said node to the next node upstream;
    retrieving the idle gap count of a tail node.

14. The method of claim 13, wherein the head node is the node at the beginning of the data stream.

* * * * *